US012202108B2

(12) United States Patent
Mendez Jaquez et al.

(10) Patent No.: US 12,202,108 B2
(45) Date of Patent: Jan. 21, 2025

(54) FASTENER DRIVING APPARATUS AND METHODS

(71) Applicant: Illinois Tool Works Inc., Glenview, IL (US)

(72) Inventors: Miguel E. Mendez Jaquez, Palatine, IL (US); Anthony M. Versino, Buffalo Grove, IL (US); Genaro Cortez, Jr., Bolingbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 247 days.

(21) Appl. No.: 17/673,502

(22) Filed: Feb. 16, 2022

(65) Prior Publication Data

US 2022/0266431 A1 Aug. 25, 2022

Related U.S. Application Data

(60) Provisional application No. 63/153,043, filed on Feb. 24, 2021.

(51) Int. Cl.
*B25C 1/04* (2006.01)

(52) U.S. Cl.
CPC .................................... *B25C 1/041* (2013.01)

(58) Field of Classification Search
CPC ...................................................... B25C 1/041
See application file for complete search history.

(56) References Cited

U.S. PATENT DOCUMENTS

| | | | | |
|---|---|---|---|---|
| 3,828,924 A | | 8/1974 | Perkins | |
| 4,157,778 A | * | 6/1979 | Villwock | B42B 4/00 227/78 |
| 5,020,712 A | | 6/1991 | Monacelli | |
| 5,193,958 A | | 3/1993 | Day | |
| 5,260,100 A | | 11/1993 | Day | |
| 5,438,829 A | | 8/1995 | Kubota et al. | |
| 5,480,088 A | | 1/1996 | Braun et al. | |
| 6,000,893 A | | 12/1999 | Gabriel et al. | |

(Continued)

FOREIGN PATENT DOCUMENTS

| | | |
|---|---|---|
| WO | 2005017355 A2 | 2/2005 |
| WO | 2015160443 A1 | 10/2015 |

OTHER PUBLICATIONS

Extended European Search Report for European Application No. 22158148.1, mailed on Oct. 13, 2022 (11 pages).

(Continued)

*Primary Examiner* — Thomas M Wittenschlaeger
*Assistant Examiner* — Katie L Gerth
(74) *Attorney, Agent, or Firm* — Neal, Gerber & Eisenberg LLP

(57) ABSTRACT

A fastener driving apparatus including an air compressor configured to generate pressurized air at a first pressure level, a drop down air regulator configured to reduce the pressurized air from being at the first pressure level to being at a reduced second pressure level, and a pneumatically powered fastener driving tool configured to receive the pressurized air at the desired reduced pressure level to enable the pneumatically powered fastener driving tool to drive one or more fasteners (such as one or more nails) into an object and a substrate at the desired positions in that object and substrate.

20 Claims, 5 Drawing Sheets

(56) References Cited

U.S. PATENT DOCUMENTS

| | | | | |
|---|---|---|---|---|
| 6,196,331 | B1 * | 3/2001 | Naito | B25C 1/047 173/168 |
| 7,137,540 | B2 | 11/2006 | Terrell et al. | |
| 7,156,012 | B2 | 1/2007 | Komazaki et al. | |
| 7,377,413 | B2 | 5/2008 | Wen | |
| 7,494,035 | B2 | 2/2009 | Weaver et al. | |
| 7,789,102 | B2 * | 9/2010 | Beckman | F04B 49/20 137/505.11 |
| 8,282,363 | B2 * | 10/2012 | Ohi | F04B 41/02 417/423.15 |
| 8,511,961 | B2 | 8/2013 | Gabriel et al. | |
| 9,381,635 | B2 | 7/2016 | Moore et al. | |
| 9,770,818 | B2 | 9/2017 | Largo | |
| 9,902,054 | B2 | 2/2018 | Croll | |
| 11,162,484 | B2 | 11/2021 | Peotter et al. | |
| 2005/0031458 | A1 * | 2/2005 | Brashears | B25H 3/006 417/313 |
| 2005/0247750 | A1 * | 11/2005 | Burkholder | B25C 1/04 227/130 |
| 2006/0045751 | A1 * | 3/2006 | Beckman | F04B 41/02 417/44.2 |
| 2006/0065309 | A1 * | 3/2006 | Leasure | F04B 41/02 137/565.18 |
| 2006/0104836 | A1 * | 5/2006 | Phillips | F04B 41/02 417/410.1 |
| 2008/0297103 | A1 * | 12/2008 | Windsor | H02J 7/0029 361/601 |
| 2010/0290929 | A1 * | 11/2010 | Ohi | F04B 41/02 417/360 |
| 2012/0298390 | A1 | 11/2012 | Schieler et al. | |
| 2014/0090732 | A1 * | 4/2014 | Schieler | B25C 1/041 137/565.18 |
| 2015/0233364 | A1 * | 8/2015 | Luby | F04B 41/02 137/565.17 |
| 2015/0290787 | A1 * | 10/2015 | Croll | B25C 1/04 137/511 |
| 2019/0170129 | A1 | 6/2019 | Peotter et al. | |
| 2023/0347487 | A1 * | 11/2023 | Craig Paterson | B25C 1/047 |

OTHER PUBLICATIONS

Canadian Office Action from Canadian Application No. 3,149,813, mailed on Jan. 30, 2024 (4 pages).

European Examination Report for European Application No. 22158148.1, mailed on Jun. 25, 2024 (7 pages).

Freeman PFR2190 manual, available at https://freemantools.com/wp-content/uploads/2016/02/PFR2190-manual.pdf on Mar. 29, 2018 (6 pages).

* cited by examiner

FASTENER DRIVING APPARATUS AND METHODS

PRIORITY

This application claims priority to and the benefit of U.S. Provisional Patent Application Ser. No. 63/153,043, filed Feb. 24, 2021, the entire contents of which are incorporated herein by reference.

BACKGROUND

Various known pneumatically powered fastener driving tools are used for driving fasteners such as nails into objects and substrates to attach such objects to such substrates. For example, various pneumatically powered fastener driving tools employ sheeting nails to attach sheeting to walls, siding nails to attach siding to walls, or trim nails to attach trim pieces to walls.

Various known pneumatically powered fastener driving tools include, among other components, a housing, a power source, a fastener supply magazine, and the combination of a workpiece contact element ("WCE") and a trigger mechanism to initiate actuation of the tool. When the WCE contacts an object, and is sufficiently inwardly depressed with respect to the housing of the fastener driving tool, the trigger mechanism can be activated to cause the actuation of the fastener driving tool and the driving of a fastener (such as a nail) into the object and the substrate to which the object is being attached.

Various known pneumatically powered fastener driving tools are connectable to a source of pressurized air such as an air compressor via an elongated hose. Various known hoses are, for example, 200 feet (60.96 meters) in length. This length enables a user to locate the air compressor outside the structure where the construction work is being performed to reduce noise in the structure. These air compressors are often used to supply pressurized air to multiple different pneumatically powered tools via individual hoses. Per various industry standards, such air compressors are typically set from a minimum output of about 90 pounds per square inch ("psi") to a maximum output of about 120 psi for powering one or more of these pneumatically powered tools. Accordingly, per various industry standards, various commercially available pneumatically powered fastener driving tools are configured to optimally operate from about 90 psi to about 120 psi.

A first set of known issues with such air compressors is that such air compressors are often leaky and the air pressure levels often significantly vary. In fact, numerous commercially implemented air compressors provide compressed air at constantly fluctuating pressure levels. Additionally, as one or more pneumatic tools are used with such air compressors, additional air often leaks out of such systems.

A second set of known issues with such pneumatically powered fastener driving tools occur when the pneumatically powered fastener driving tool drives a nail too far into the object and the substrate. This is generally illustrated in FIG. 1A that shows a nail 2 driven too far into an object 4 and a substrate 6. In such instance, the nail 2 (which may be driven substantially or completely through the object) does not function to properly attach the object 4 to the substrate 6. To solve this problem, the user may need to drive another nail into the object and substrate adjacent to such improperly driven nail. This waste nails and time. This also causes an undesired indentation or hole to be formed in the object above the head of the nail where the improperly driven nail is located. In various other such instances, a nail may be driven partially through the object, and while such nail functions to properly attach the object to the substrate, this also causes an undesired indentation or hole to be formed in the object above the head of the nail where the improperly driven nail is located. This also often causes a shadow to be seen at various times based on lighting conditions. This is generally illustrated in FIG. 1B that shows a nail 2 driven slightly farther then desired into an object 4 and a substrate 6. A shadow 7 is also indicated in FIG. 1B. In both such instances, it is preferable for the undesired hole to be filled in to provide a smooth outer finish for the object. This waste time and causes additional materials to be used for the attachment process. If not filled, the locations of the nails are often clearly exposed and the shadows can enhance the exposure of these nails in a very undesired manner, especially when the object is viewed from a distance.

A third set of known issues with such pneumatically powered fastener driving tools occur when the air pressure to the fastener driving tool is set or drops way too low, and causes the pneumatically powered fastener driving tool to incompletely drive the nail into the object and the substrate. This is generally illustrated in FIG. 1C that shows a nail 2 not driven sufficiently into an object 4 and a substrate 6. FIG. 1C also shows that in this case, if the nail is not further driven into the object and substrate, a shadow 7 can often be seen at various times based on lighting conditions. These issues can also occur due to other reasons. In various such cases, it is preferred that the user employs a manual hammer for completing the fastener driving process. This wastes time and causes additional strain on the user. Depending on the final position of the nail after such secondary driving process, the nail may still cause a shadow to occur that enhances the exposure of the nail in a very undesired manner, especially when the object is viewed from a distance.

One solution to the second and third sets of known issues described above is for a pneumatically powered fastener driving tool to have one or more adjustable settings that enables the user to set the force used to drive the nail and/or the depth that the nail will be driven. This solution creates a more complicated tool, a heavier tool, a more expensive tool, and a tool subject to additional failures (in the harsh environments in which they are used) and related required repairs. This solution also does not solve the second set of known issues for existing pneumatically powered fastener driving tool that do not have such an adjustable settings. Additionally, if the fastener driving tool is set at a substantially lower or shorter driving setting, and the air pressure to the fastener driving tool drops, the tool is more likely to not drive the nail sufficiently into the object and the substrate, which results in the above described incompletely driven nail set of issues. Additionally, such tools typically operate without changing or accounting for changes to the inputted air pressure, but rather change how the tools absorb excess energy. Accordingly, such tools do not adequately solve these issues and this solution has not been widely commercially implemented.

A fourth set of known issues with such pneumatically powered fastener driving tools occur even when the pneumatically powered fastener driving tool drives the nail into the object and the substrate at the correct distance or position. In various such instances, the head of the nail is aligned or flush with the outer surface of the object. This is generally illustrated in FIG. 1D that shows a nail 2 driven into an object 4 and a substrate 6, wherein the outer surface of the head 3 of the nail 2 is aligned with the outer surface of the object 4. However, in many instances, the color of the head 3 of the nail 2 does not exactly match the color of the outer surface of the object 4. This can again be problematic in various lighting conditions. To solve this problem, the user may need to use a suitable paint to touch up the head of the nail to match the color of the outer surface of the object 4. This waste materials and time. Additionally, even if the nail is substantially aligned but not perfectly aligned, in various lighting conditions, shadows can be seen.

One solution to this fourth set of issues that has been generally proposed is to apply an object color matching paint to the heads of such nails or the entire nail before driving such nails. One problem with this proposed solution is that during the fastener driving process, the driver blade of the fastener driving tool that engages the head of the nail with substantial force to drive the nail into the object and the substrate may scratch, chip, or otherwise damage the paint on the head of the nail. To solve this problem, the user would again need to use suitable paint to touch up the head of the nail to match the color of the outer surface of the object. This waste materials and time. Accordingly, this solution has not been widely commercially implemented.

Accordingly, there is need to address these multiple sets of issues.

SUMMARY

Various embodiments of present disclosure provide fastener driving apparatus and methods that overcome the above sets of issues. Various embodiments of the present disclosure provide a fastener driving apparatus that includes a pneumatically powered fastener driving tool powered by a pressurized air supply apparatus that supplies air pressure at a desired reduced pressure level to the pneumatically powered fastener driving tool to enable the pneumatically powered fastener driving tool to drive a fastener (such as a nail) into an object and substrate at the desired position in the object and the substrate. The reduced pressure level is a designated pressure level below the output of the air compressor. Various embodiments of the present disclosure also provide a method that includes supplying, via a pressurized air supply apparatus, air pressure at a desired reduced pressure level (relative to the air pressure level provided by an air compressor) to a pneumatically powered fastener driving tool to enable the pneumatically powered fastener driving tool to drive a fastener (such as a nail) into an object and substrate at a desired position in the object and the substrate. In various embodiments of the present disclosure, the apparatus and methods also cause the fastener to be driven without scratching, chipping, or otherwise damaging a coating (such as paint) on the head of the fastener.

Other objects, features, and advantages of the present disclosure will be apparent from the following detailed disclosure and accompanying drawings.

DETAILED DESCRIPTION

Figure 1A:
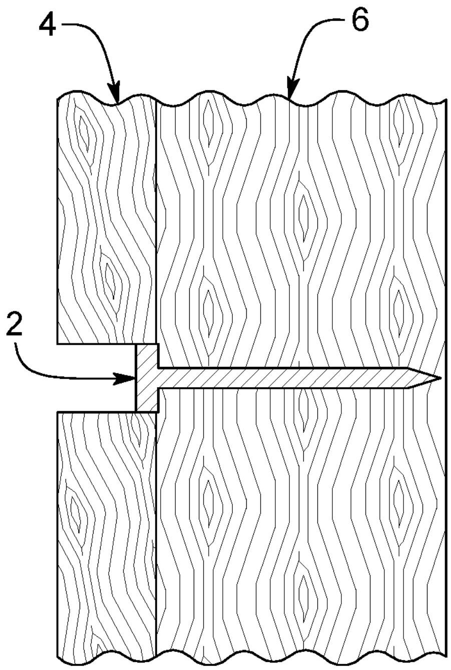
FIG. 1A is a cross-sectional view of a nail driven too far into an object (shown in fragmentary) and a substrate (shown in fragmentary).

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

Various embodiments of present disclosure generally provide a fastener driving apparatus including: (1) an air compressor configured to generate pressurized air at a first pressure level, (2) a pressurized air storage tank, (3) a drop down air regulator connectable to the pressurized air storage tank, (4) a pneumatically powered fastener driving tool including a fastener driver, (5) a first air supply hose configured to fluidly communicate pressurized air between the air compressor and the air storage tank, and (6) a second air supply hose configured to fluidly communicate pressurized air between the air storage tank and the pneumatically powered fastener driving tool. The drop down air regulator configured to reduce the pressurized air from being at the first pressure level to being at a reduced second pressure level. The pneumatically powered fastener driving tool configured to either: (a) employ the pressurized air at the first pressure level to generate a first driving force on the fastener driver to drive a fastener; or (b) employ the pressurized air at the second reduced pressure level to generate a reduced second driving force on the fastener driver to drive the fastener. The pneumatically powered fastener driving apparatus thus uses the pressurized air supply apparatus to supply pressurized air at a desired reduced pressure level to cause the pneumatically powered fastener driving tool to drive the nail with sufficient amount of force to still drive the nail into the object and the substrate but not to drive the nail too far into the object and the substrate.

Various embodiments of present disclosure generally provide a method of operating a fastener driving apparatus including causing an air compressor to generate pressurized air at a first pressure level, reducing, via a drop down air regulator, the pressurized air from being at the first pressure level to being at a reduced second pressure level, storing the pressurized air in a storage tank, and causing a pneumatically powered fastener driving tool including a fastener driver to employ the pressurized air at the second reduced pressure level to generate a reduced second driving force on a fastener driver to drive a fastener. In certain embodiments, the drop down air regulator reduces the pressurized air from being at the first pressure level to being at the reduced second pressure level before the pressurized air enters the air storage tank. In certain embodiments, the drop down air regulator reduces the pressurized air from being at the first pressure level to being at the reduced second pressure level after the pressurized air exits the air storage tank. In certain embodiments, the fastener includes a nail with a head with a coating, and the method includes causing the pneumatic fastener driving tool to drive the nail into an object without damaging the coating on the head of the nail. In certain embodiments, the coating on the head of the nail is substantially the same color as the outer surface of the object.

Figure 2:
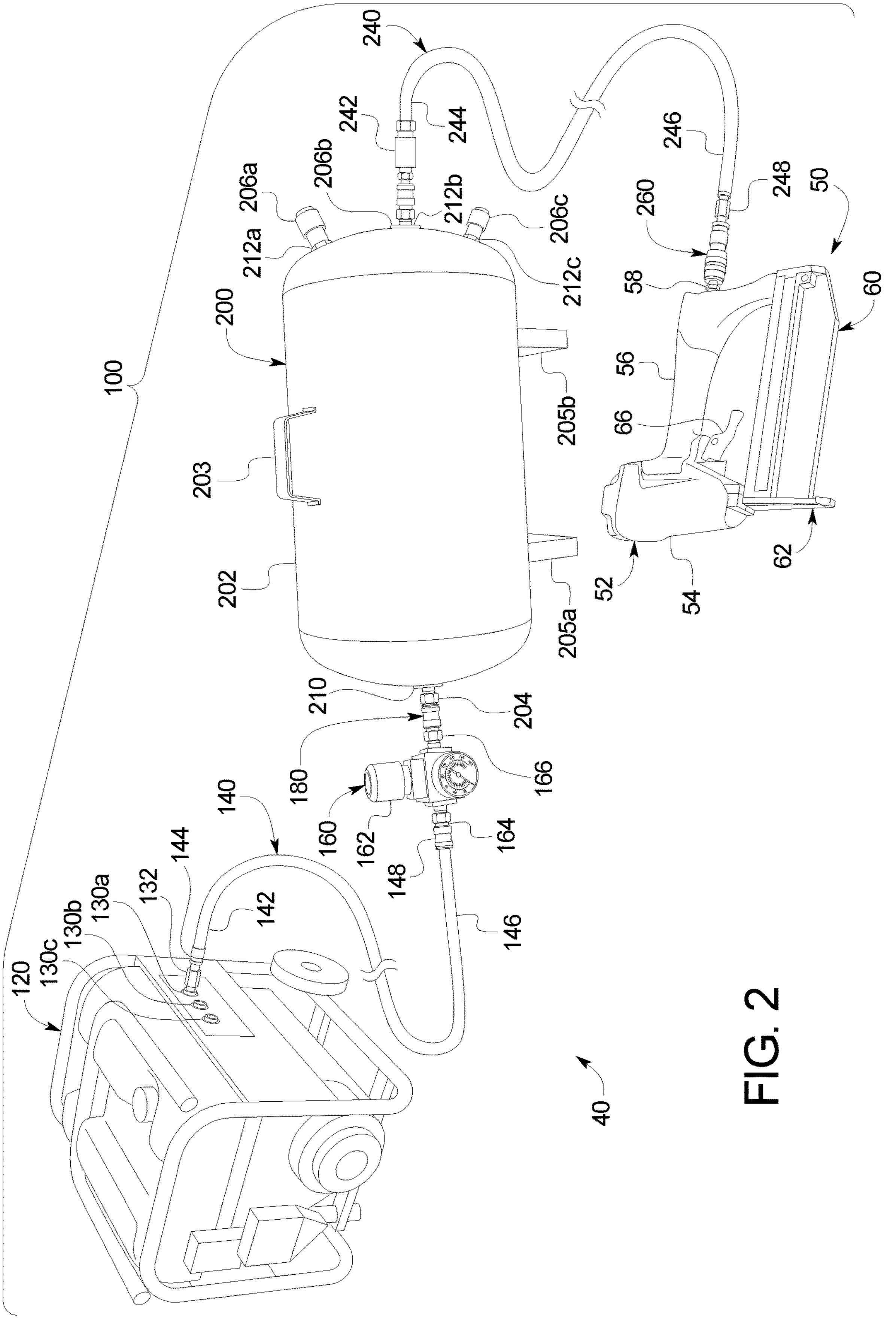
FIG. 2 is a perspective view of a fastener driving apparatus of one example embodiment of the present disclosure.

Referring now to back to the figures, FIG. 2 illustrates one example embodiment of the pneumatically powered fastener driving apparatus of the present disclosure that is indicated by numeral 40. The pneumatically powered fastener driving apparatus 40 includes: (1) a pneumatically powered fastener driving tool 50; and (2) a pressurized air supply apparatus 100 configured to supply pressurized air at a desired reduced air pressure level to the pneumatically powered fastener driving tool 50. Generally, the pneumatically powered fastener driving tool 50 is provided pressurized air at the desired reduced air pressure level by the pressurized air supply apparatus 100 to enable the pneumatically powered fastener driving tool 50 to drive one or more fasteners (such as one or more nails) into an object and a substrate at the desired positions in that object and substrate, as further described below.

For brevity, the pneumatically powered fastener driving apparatus 40 may sometimes be referred to herein as "the fastener driving apparatus" or as "the apparatus." For brevity, the pneumatically powered fastener driving tool 50 may sometimes be referred to herein as "the fastener driving tool" or as "the tool." For brevity, the pressurized air supply apparatus 100 may sometimes be referred to herein as "the air supply apparatus."

More specifically, in this illustrated example embodiment, as best seen in FIG. 2, the pneumatically powered fastener driving tool 50 includes a housing 52 having a generally upright portion 54 and a transverse handle portion 56 connected to and extending rearwardly from the upright portion 54. The handle portion 56 includes an rearwardly extending pneumatic air connection coupler 58. The tool 50 includes a pneumatic power source (not shown) including one or more internal air storage chambers (not shown) fluidly connected to the pneumatic air connection coupler 58. The tool 50 also includes a magazine 60 connected to the housing 52 and configured to feeds nails to a nosepiece 62 of the tool 50 that is connected to and extends from the upright portion 54 of the tool 50. The tool 50 further includes a workpiece contact element ("WCE") (not shown) supported by the housing 52 and coupled to the nosepiece 62. The tool 50 includes a trigger mechanism 66 supported by the housing 52. When the WCE contacts an object, and is sufficiently inwardly depressed with respect to the housing 52, the trigger mechanism 66 can be actuated to cause the actuation of the fastener driving tool 50. The actuation of the fastener driving tool 50 includes the pneumatic power source using the pressurized air supplied to the tool 50 (as further described below) to rapidly move a piston (not shown) of the tool 50 and fastener driver blade (not shown) of the tool 50 that is attached to the piston into contact with the head of a nail (that is supplied by the magazine 60 into the nosepiece 62) to drive the nail into the object and the substrate to which the object is being attached. This example tool 50 is one example embodiment of a pneumatically powered fastener driving tool of the present disclosure, and it should be appreciated that other known pneumatically powered fastener driving tools or pneumatically powered fastener driving tools developed in the future can be employed in accordance with the present disclosure. It should also be appreciated that since such pneumatically powered fastener driving tools are well known, no additional description of the components of such tool is needed for a complete understanding of the present disclosure.

In this illustrated example embodiment, the pressurized air supply apparatus 100 includes: (1) an air compressor 120; (2) a first air supply hose 140; (3) a drop down air regulator 160; (4) a first check valve 180; (5) an air storage tank 200; (6) a second check valve (not shown but which can be employed if needed); (7) a second air supply hose 240; and (8) a coupler 260. The first air supply hose 140 is removably mechanically and fluidly connectable to the air compressor 120 and to the drop down air regulator 160. The drop down air regulator 160 is removably mechanically and fluidly connectable to the first check valve 180. The first check valve 180 is removably mechanically and fluidly connectable to the air storage tank 200. The second check valve, if employed, is removably mechanically and fluidly connected to an output of the air storage tank 200. The second air supply hose 240 is removably mechanically and fluidly connected to either the second check valve, if employed, or the air storage tank 200, and to the coupler 260. The coupler 260 is removably mechanically and fluidly connected to the pneumatic air connection coupler 58 of the tool 50.

Generally, in this example embodiment, the air compressor 120 in configured to create pressurized air at a set first pressure level (such as set from about 90 psi to about 120 psi) and to supply that pressurized air through the first air supply hose 140 to the drop down air regulator 160. The drop down air regulator 160 is configured to reduce the pressure level of that supplied pressurized air from the set first pressure level (such as from about 90 psi to about 120 psi) to a reduced second pressure level (such as from about 60 psi to about 100 psi). For example, if the set first air pressure level is at 100 psi, the reduced second pressure level can be about 80 psi. In various embodiments, the reduction of the pressure level is about 20 psi. In various other embodiments, the reduction of pressure level ranges from about 8 psi to about 10 psi. In various other embodiments, the reduction of pressure level ranges from about 8 psi to about 20 psi. The reduction can depend on various factors such as, but not limited to, characteristics of the air compressor, the tool, the nail, the object, and/or the substrate. The drop down air regulator 160 is configured to supply the pressurized air at the set reduced second level to the first check valve 180 which in turn allows that pressurized air at the reduced second level into the air storage tank 200. It should be appreciated that in various embodiments the drop down air regulator 160 has an adjustable setting assembly that enables the operator to set the reduced second pressure level from a plurality of different pressure levels. The air storage tank 200 holds a sufficient amount of that pressurized air at the reduced second level (such as at about 80 psi) until such pressurized air is needed by the tool 50. When the pressurized air is needed by the tool 50, the pressurized air at the reduced second level flows from the storage tank 200 to and through the second check valve, if employed, to and through the second air supply hose 240, to and through the coupler 260, to and through the coupler 58 of the tool 50, and into power supply of the tool 50.

In various example embodiments, even though the tool 50 is configured to optimally drive nails at about 90 psi to about 120 psi, the tool 50 will still operate at a sub-optimal pressure (for the driving process and/or for the return process) to drive nails at reduced air pressures lower than about 90 psi (such as at about 80 psi). At such reduced air pressures, the tool 50 will drive each nail with relatively less force applied to the head of the nail. The pneumatically powered fastener driving apparatus 40 of the present disclosure thus intentionally uses the pressurized air supply apparatus 100 to supply pressurized air at a desired sub-optimal reduced pressure level to cause the pneumatically powered fastener driving tool 50 to drive the nail with sufficient amount of force to still drive the nail into the object and the substrate but not to drive the nail too far into the object and the substrate, as further explained below. Thus, in certain embodiments of the present disclosure, counter to conventional thinking regarding making such pneumatic fastener driving tools operate in optimal manners, the present disclosure contemplates making such pneumatic fastener driving tools operate in the described sub-optimal manner(s) to drive the nails at more desired force levels and to appropriately drive certain nails into certain objects and substrates. It should be appreciated that such sub-optimal operation is not required by various embodiments of the present disclosure.

Additionally, it should be appreciated that at the reduced pressure level, the pneumatically powered fastener driving tool 50 will engage the head of the nail to drive the nail with sufficient amount of force without damaging a coating on the head of the nail, as further explained below.

More specifically, the air compressor 120 can be any suitable air compressor that is configured to produce and output a continuous supply of pressurized air at a first air pressure level (such as and industry standard level of about 90 psi to about 120 psi). The air compressor 120 in this illustrated example embodiment is electrically powered, although it can be powered by other suitable energy sources. The air compressor 120 includes at least one air inlet port (not shown or labeled) and at least one air outlet port. This example air compressor 120 is shown with three outlet ports 130*a*, 130*b*, and 130*c*. The air compressor 120 can include one or more outlet couplers (such as outlet coupler 132) suitably connected to the respective air outlet port 130*a*. It should be appreciated that while the air compressor 120 can in certain circumstances be employed to only supply the tool 50 with pressurized air, in many circumstances the air compressor 120 will be employed for supplying pressurize air to one or more various other tools and apparatus. Due to the potential or actual need to supply such other tools and apparatus, the air compressor 120 may need to be set to supply air pressure at the first pressure level (such as the industry standard level of about 90 psi to about 120 psi).

The first air supply hose 140 can be any suitable air supply hose configured to communicate pressurized air in accordance with the present disclosure. In this example embodiment, the first air supply hose 140 is an elongated rubber hose having a ⅜ inch (0.953 cm) diameter and a length of 100 feet (30.48 meters). It should be appreciated that, in various alternative embodiments, the first air supply hose 140 can be any suitable size, diameter, and length. The first air supply hose 140 includes a first hose coupler 144 at a first end 142 of the first air supply hose 140. The first hose coupler 144 is configured to be removably securely attached to the outlet coupler 132 of the air compressor 120. The first air supply hose 140 also includes a second hose coupler 148 at an opposite second end 146 of the first air supply hose 140. The second hose coupler 148 is configured to be removably securely attached to the inlet coupler 164 of the drop down air regular 160. In various embodiments, either one or both of these couplers 144 and 148 can be quick disconnect couplers.

The drop down air regulator 160 can be any suitable air pressure regulator that is configured to receive pressurized air at a first level and output pressurized air at a desired reduced second level. The drop down air regulator 160 includes a housing 162 and a suitable adjustable setting assembly (not shown) supported by the housing and that enables the operator to set the reduced second pressure level that the drop down air regulator 160 will output. The housing 162 of the drop down air regulator 160 includes an air inlet port (not shown or labeled) and an air outlet port (not shown or labeled). The drop down air regulator 160 includes an air inlet coupler 164 connected to the air inlet port on one side of the housing 162. The drop down air regulator 160 includes an air outlet coupler 166 connected to the air outlet port on an opposite side of the housing 162. The drop down air regulator 160 is configured to receive from the air compressor 120 the pressurized air supply at the first level (such as about 90 psi to about 120 psi) and reduce the pressure level of the pressurized air to a reduced second level (such as about 60 psi to about 100 psi). It should be appreciated that the drop down air regulator 160 can reduce the pressurized air supply to a reduced second pressure level within such a suitable range, and that the exact amount of the reduction can vary in accordance with the present disclosure. It should be appreciated that the amount of the reduced second pressure level can be based on various characteristics of the air compressor, the tool, the nail, the object, and the substrate, as well as the desired amount of buffer pressure (which is the desired difference between the first pressure level and the second pressure level).

The first check valve 180 can be any suitable check valve configured to allow pressurized air to flow through the check valve 180 in only one direction in accordance with the present disclosure. The first check valve 180 includes an air inlet coupler (not labeled) connected to the air outlet coupler 166 of the drop down air regulator 160. The first check valve 180 also includes and an air outlet coupler (not labeled) connected to the air inlet coupler 204 of the air storage tank 200. The check valve 180 allows pressurized air at the reduced pressure level to be communicated to the air storage tank 200 from the drop down regulator 160 and prevents the pressurized air from re-entering the drop down regulator 160 from the air storage tank 200.

The air storage tank 200 can be any suitable air storage tank configured to store pressurized air for a period of time in accordance with the present disclosure. In this illustrated example embodiment, the air storage tank includes 200 a partially cylindrical housing 202 that defines one or more internal pressurized air storage chambers (not shown). The housing 202 includes an air inlet port 210 and a plurality of air outlet ports 212*a*, 212*b*, and 212*c*. The air storage tank 200 includes an air inlet coupler 204 connected to the air inlet port 210. The example air storage tank 200 also includes one or more air outlet couplers 206*a*, 206*b*, and 206*c* respectively connected to the air outlet ports 212*a*, 212*b*, and 212*c*. It should be appreciated that the quantity of air outlet ports can vary in accordance with the present disclosure.

In this example embodiment, the example air storage tank 200 has a ten gallon air capacity. It should be appreciated, that the air storage tank can be any suitable size and have any suitable capacity. In this example embodiment air storage tank 200 includes a handle 203 for transporting the air storage tank. In this example embodiment, the air storage tank includes supports 205*a* and 205*b* to enable the air storage tank 200 to be positioned on an suitable surface adjacent to the location at which the tool is being used. The air storage tank 200 includes a safety relief valve (not shown) for releasing excess pressure that builds up within the air storage tank 200 and a drain (not shown) for releasing moisture and water that may accumulate inside of the air storage tank 200 during use. In this example embodiment, the air storage tank receives the pressurized air at the reduced second pressure level and stores that pressurized air at that reduced second pressure level to supply that pressurized air at that reduced second pressure level to the pneumatic fastening tool 50.

As mentioned above, a second check valve (not shown) can be employed on the outlet side of the air storage tank 200.

The second air supply hose 240 can be any suitable air supply hose configured to communicate pressurized air in accordance with the present disclosure. In this example embodiment, the second air supply hose 240 is an elongated rubber hose having a ¼ inch (0.635 cm) diameter and a length of 100 feet (30.49 meters). In various embodiments, the second air hose 240 is substantially shorter such as 10 feet (3.048 meters), and in certain embodiments particularly minimized to be as close to the fastener driving site as possible. It should be appreciated that, in various alternative embodiments, the second air supply hose 240 can be any suitable size, diameter, and length. The second air supply hose 240 includes a first hose coupler 242 at a first end 244 of the second air supply hose 240. The first hose coupler 242 is configured to be removably securely attached to an outlet coupler of the air supply tank 200. The second air supply hose 240 also includes a second hose coupler 248 at an opposite second end 246 of the second air supply hose 240. The second hose coupler 248 is configured to be removably connected to the pneumatic air connection coupler 58 of the tool 50. In various embodiments, either one or both of these couplers 244 and 148 can be quick disconnect couplers.

Having described the various structural components of this example embodiment of the fastener driving apparatus 40, a brief description of one example method of operating the fastener driving apparatus 40 is now provided. The compressor 120 intakes air and creates pressurized air at a first pressure level of about 90 psi to about 120 psi. The compressor 120 communicates this pressurized air at the first pressure level to the first air supply hose 140. The compressor 120 can also communicate pressurized air at this first pressure level to one or more other pneumatic devices (not shown) via one or more additional air supply hoses (not shown). The first air supply hose 140 communicates this pressurized air at the first pressure level of about 120 psi to the drop down air regulator 160. The drop down air regulator 160 reduces the pressure level of the received pressurized air from the first pressure level (such as from about 90 psi to about 120 psi) to a reduced second pressure level (such as from about 60 psi to about 100 psi). It should be appreciated that this reduced second pressure level can vary in such the range in accordance with the present disclosure. The drop down air regulator 160 communicates the pressurized air at the reduced second pressure level to the first check valve 180. The first check valve 180 communicates or allows this pressurized air to be communicated into the air storage tank 200 without returning to the drop down air regulator 160. The air storage tank 200 holds a sufficient amount of this pressurized air at the reduced second pressure level until such pressurized air is needed by the tool 50. When the pressurized air is needed by the tool 50, the pressurized air at the reduced second pressure level flows from the storage tank 200 through the coupler 260 to the second air supply hose 240. The pressurized air at the reduced second pressure level flows through the second air supply hose 240 though the coupler 58 of the tool 50 and into power supply of the tool 50.

Figure 1B:
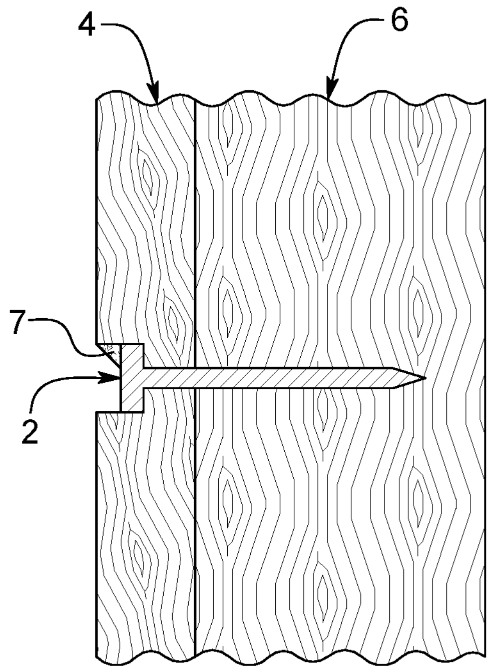
FIG. 1B is a cross-sectional view of a nail driven slightly farther then desired into an object (shown in fragmentary) and a substrate (shown in fragmentary).
Figure 1C:
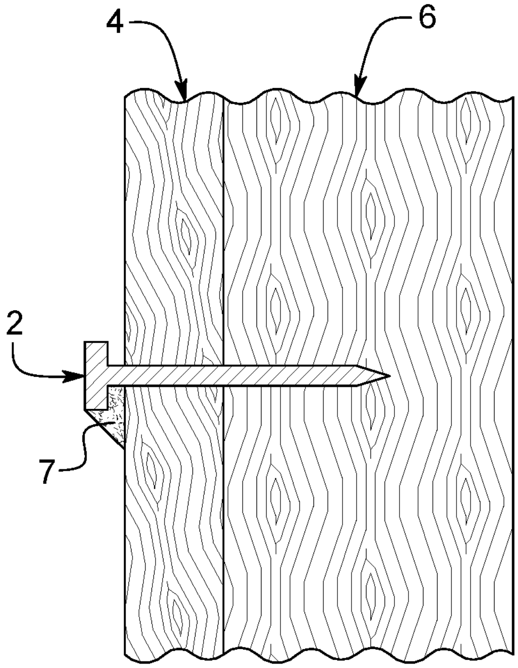
FIG. 1C is a cross-sectional view of a nail not driven sufficiently enough into an object (shown in fragmentary) and a substrate (shown in fragmentary).
Figure 1D:
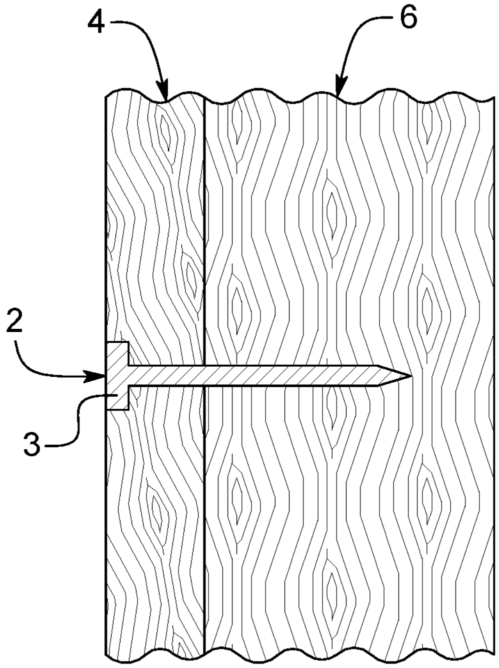
FIG. 1D is a cross-sectional view of a nail driven into an object (shown in fragmentary) and a substrate (shown in fragmentary), wherein the outer surface of the head of the nail is substantially aligned with the outer surface of the object.

For each actuation of the pneumatic fastener driving tool 50 supplied with this reduced second pressure level, the pneumatic fastener driving tool 50 generates a suitable reduced driving force for driving each fastener due to this received pressurized air at the reduced second pressure level. For example, based on the received pressurized air at the reduced second pressure level of about 80 psi, the pneumatic fastener driving tool 50 can generate enough driving force for driving each nail. This reduced driving force can be lower than the optimal driving force that the pneumatic fastener driving tool 50 would normally generate when it receives pressurized air at the first pressure level such as of about 120 psi. This reduced driving force that the pneumatic fastener driving tool 50 applies to the nail enables the nail to be driven into the object and the substrate as shown in FIG. 1D. This driving of the nail at the reduced driving force reduces the likelihood of occurrence of the sets of issues described above in relation to FIGS. 1A and 1B (i.e., the force does applied does not drive the nail too far into the object and the substrate). This driving of the nail at the reduced driving force also is also sufficient enough to reduce the likelihood of occurrence of the set of issues described above in relation to FIG. 1C (i.e., the force is sufficient enough to drive the nail into the object and the substrate). It should also be appreciated that the reduced second air pressure level will be much more constant because it is below the pressure ranges provided by the air compressor and thus accounts for leaky air compressor and other fluctuations of air pressure in the entire apparatus.

In various embodiments of this method, the tool is positioned at about 90 degrees (about perpendicular) relative to object.

It should be appreciated that the reduced pressure level can be different for different nails, different objects, different substrates, and different combinations thereof in accordance with the present disclosure. Below is a table showing example reduced pressure level ranges that can be employed with these example different nails, objects, substrates, and combinations thereof.

| Application | Substrate | Fastener | Pressure Range |
|---|---|---|---|
| Sheathing | OSB into Framing lumber | 2-⅜"× .113" | 80-110 psi |
| Trim | Pine casing into Framing lumber | 16 ga × 1-½" Trim | 60-75 psi |
| Trim | Pine casing into Framing lumber | 16 ga × 2" Trim | 70-85 psi |
| Siding | Fiber cement, OSB, Framing lumber | 16 ga × 1-½" Trim | 60-70 psi |
| Siding | Fiber cement, OSB, Framing lumber | 16 ga × 2" Trim | 70-80 psi |

In the above examples, the framing lumber may include for example the most common species which are: (1) SPF—Spruce Pine Fir; (2) DF—Douglas Fir; and (3) SYP—Southern Yellow Pine. In the above example for sheathing, the air compressor first pressure level can be in a higher range such as about 115 psi to about 145 psi and the second reduced pressure level can be in a range such as about 80 psi to about 110 psi. It should be appreciated from this example that the sets of first and second ranges can vary in accordance with the present disclosure, and the compressor air pressure level may need to be set above the industry standards as discussed above.

Figure 4:
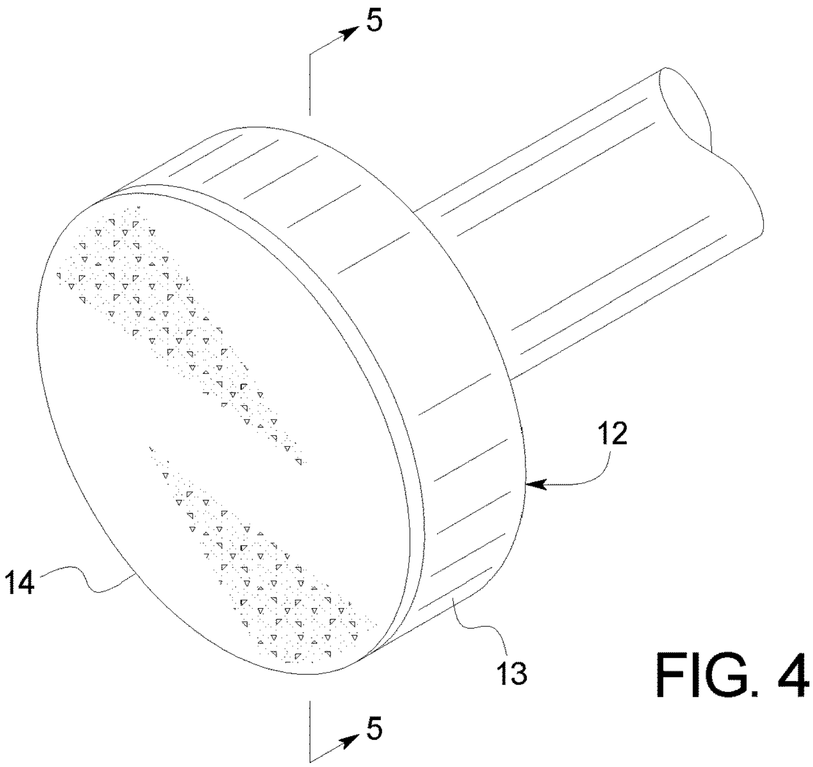
FIG. 4 is an enlarged fragmentary perspective view of a nail having a coated head (which is not drawn to scale) for use with the fastener driving apparatus and/or method of the present disclosure.
Figure 5:
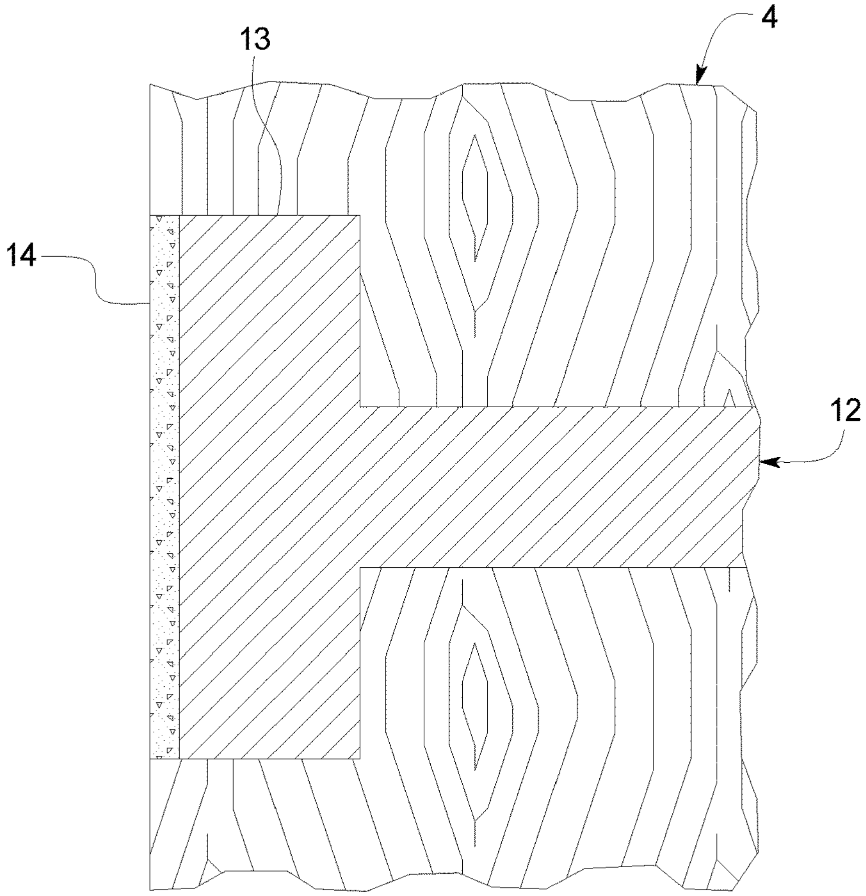
FIG. 5 is an enlarged fragmentary cross-sectional view of the nail of FIG. 4 taken substantially along line 5-5 of FIG. 4, and shown driven into an object (shown in fragmentary) and a substrate (not shown), wherein the coating on the head (which is not drawn to scale) of the nail is substantially aligned with the outer surface of the object.

The reduced driving force generated by the pneumatic fastener driving tool 50 due to this received pressurized air at the reduced pressure level also facilitates the use of coatings on the heads of nails. As mentioned above, the fourth set of issues occur even when the pneumatically powered fastener driving tool drives the nail into the object and the substrate at the correct distance or position, but the color of the head of the nail does not match the color of the outer surface of the object. The apparatus and method of the present disclosure enables nails with coated heads to be employed. Specifically, the coatings on the heads can be the same color as the outer surface of the substrate. This is shown in FIGS. 4 and 5, which show a nail 12 having a head 13 and a coating 14 on the outer surface of the head 13. FIG. 5 also illustrates of the nail 12 of FIG. 4 driven into the object 4. As shown in FIG. 5, the outer surface of the coating 14 is substantially aligned with the outer surface of the object 4 after the nail is driven into the substrate using the apparatus or method of the present disclosure. The coating 14 can be of the same or substantially the same color of the object 4. It should be appreciated that the thickness of the coating 14 on the head 13 of the nail 12 is enlarged and not drawn to scale in FIGS. 4 and 5 for illustration purposes only and that the coating is expected to be much thinner relative to the thickness of the head 13 of the nail 12. The driving of the nail 10 at the reduced driving force, as mentioned above, is also low enough to reduce the likelihood of occurrence of the fastener driver blade damaging the coating 14 on the outer surface of the head 13 of the nail 12. Thus, the apparatus and method of the present disclosure addresses the fourth set of issues described above.

It should be appreciated that if there is a drop in the air pressure supplied by the compressor 120 due to the length of the first air supply hose 140 or other reason, this drop is expected to be inconsequential because the drop down regulator 162 is configured to reduce the air pressure.

It should be appreciated that the sequential fire mode of the tool in various embodiments will produce more consistent results than the bump fire mode of the tools and thus various embodiments include only using the sequential fire mode.

It should also be appreciated that for certain tools, the reduced air pressure described above can be combined with an appropriate setting of the tool depth setting device to obtain desired nail positioning.

It should be appreciated that for certain embodiments, test firing using test reduced pressure levels and various settings may need to be done before the actual firing of the nails.

Figure 3:
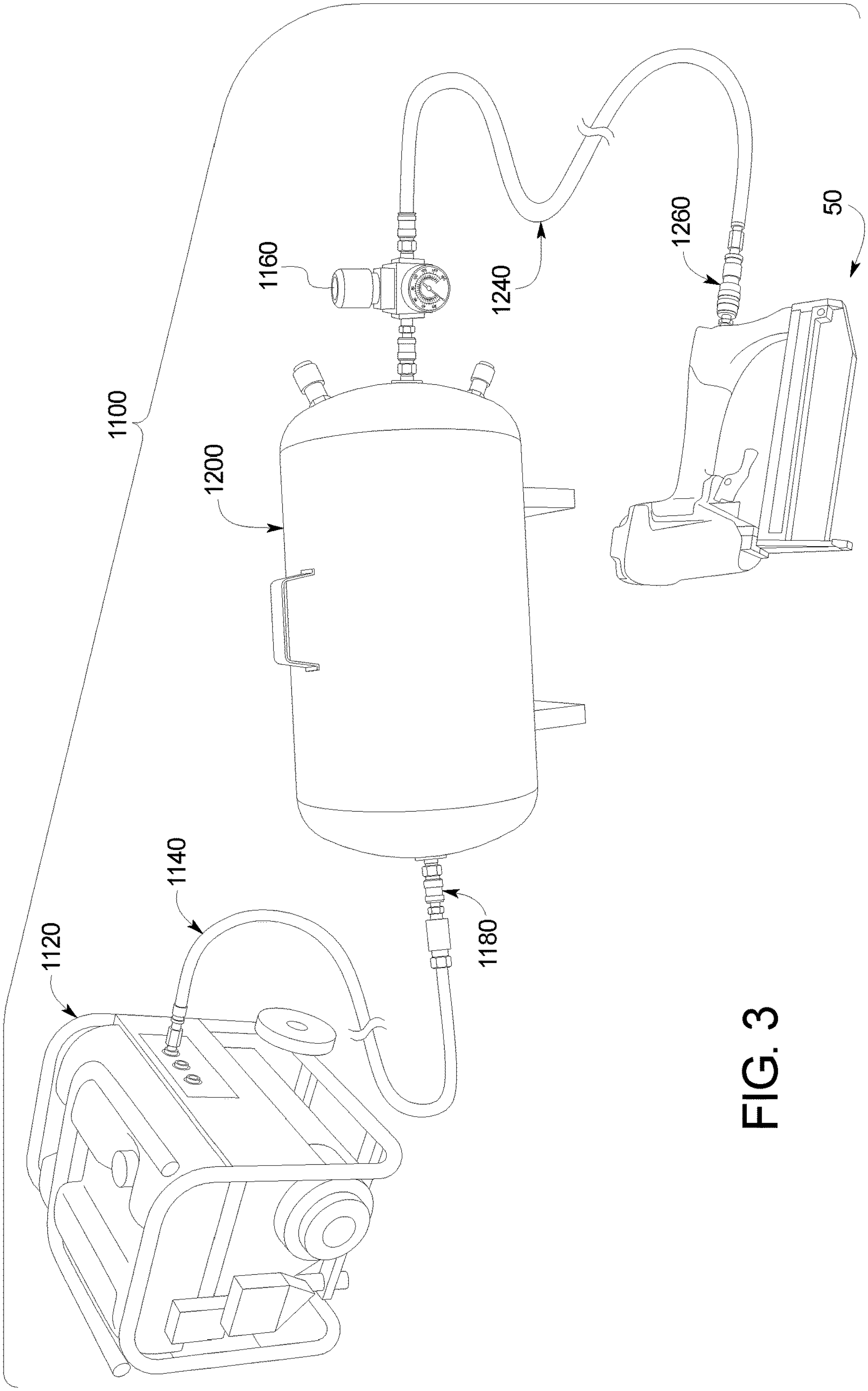
FIG. 3 is a perspective view of a fastener driving apparatus of another example embodiment of the present disclosure.

FIG. 3 illustrates an alternative embodiment of the pressurized air supply apparatus of the present disclosure generally indicated by numeral 1100. This pressurized air supply apparatus 1100 includes: (1) an air compressor 1120; (2) a first air supply hose 1140; (3) a drop down air regulator 1160; (4) a first check valve 1180; (5) an air storage tank 1200; (6) a second air supply hose 1240; and (7) a coupler 1260 connectable to a fastener driving tool such as tool 50 described above. In this alternative example embodiment, all of the components are the same as described above, except that the drop down air regulator 1160 is connected to an outlet coupler of the air storage tank 1200. The drop down air regulator 1160 reduces the level of the air pressure received from the storage tank 1200 before that air pressure at a reduced second pressure level is communicated to the tool 50. This provides the same benefits as described above.

Figure 3A:
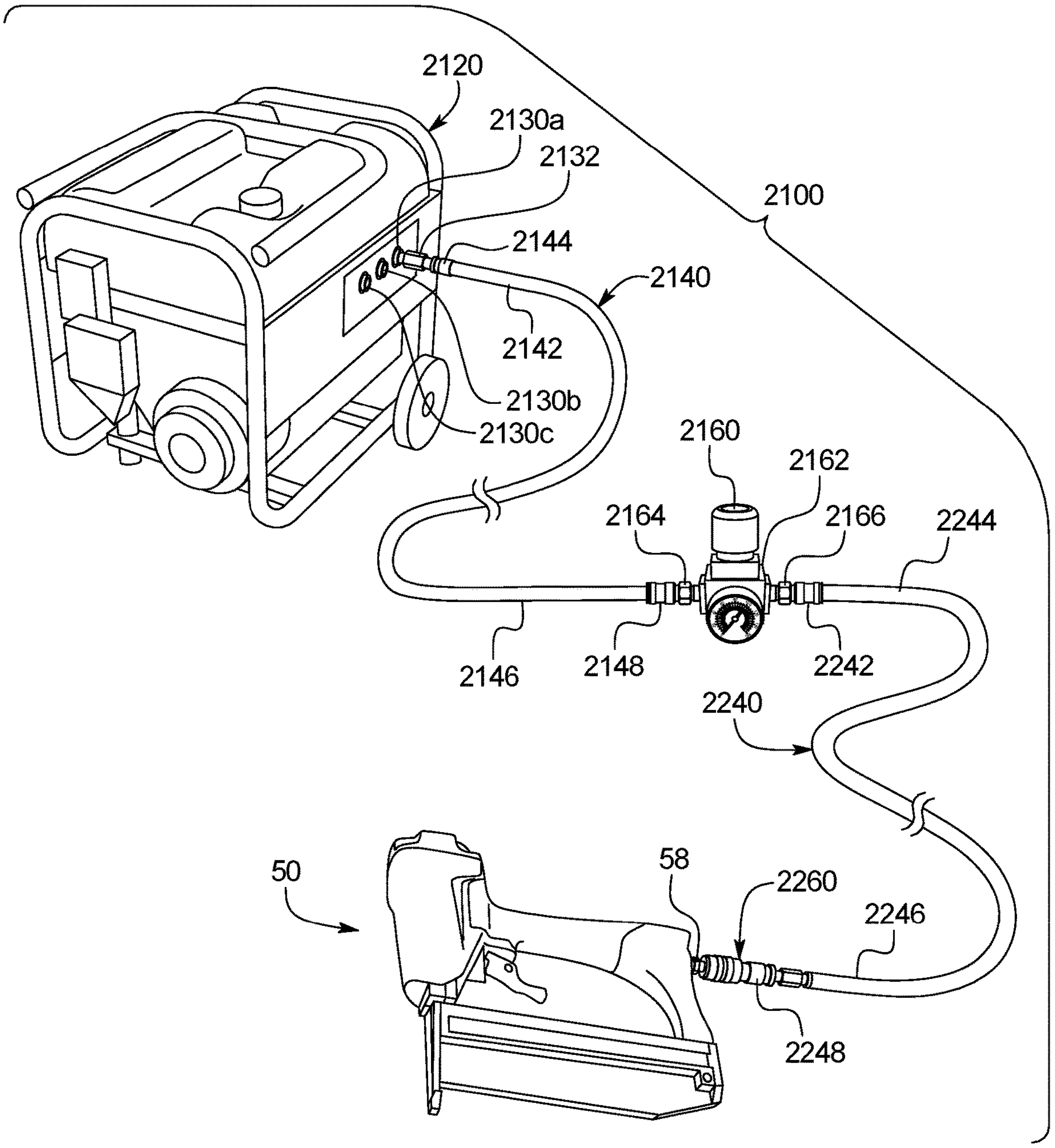
FIG. 3A is a perspective view of a fastener driving apparatus of another example embodiment of the present disclosure.

FIG. 3A illustrates a further alternative embodiment of the pressurized air supply apparatus of the present disclosure generally indicated by numeral 2100. The pressurized air supply apparatus 2100 is configured to supply pressurized air at a desired reduced air pressure level to the pneumatically powered fastener driving tool 50 (as part of the pneumatically powered fastener driving apparatus of the present disclosure). The pressurized air supply apparatus 2100 includes: (1) an air compressor 2120; (2) a first air supply hose 2140; (3) a drop down air regulator 2160; (4) a second air supply hose 2240; and (5) a coupler 2260 connectable to a fastener driving tool such as tool 50 described above. The drop down air regulator 2160 is removably mechanically and fluidly connectable to the first air hose 2140. The second air supply hose 2240 is removably mechanically and fluidly connected to the drop down air regulator 2160. The coupler 2260 is removably mechanically and fluidly connected to the second air hose 2240 and the pneumatic air connection coupler 58 of the tool 50. In this alternative example embodiment, all of the components are thus the same as described above, except that the air storage tank has been removed and the drop down air regulator 2160 is directly connected to the first air hose 2140. The drop down air regulator 2160 reduces the level of the air pressure received from the air compressor 2120 through the first hose 2140 before that air pressure at a reduced second pressure level is communicated through the second air hose 2240 to the tool 50.

Generally, in this example embodiment, the air compressor 2120 in configured to create pressurized air at a set first pressure level (such as set from about 90 psi to about 120 psi) and to supply that pressurized air through the first air supply hose 2140 to the drop down air regulator 2160. The drop down air regulator 2160 is configured to reduce the pressure level of that supplied pressurized air from the set first pressure level (such as from about 90 psi to about 120 psi) to a reduced second pressure level (such as from about 60 psi to about 100 psi). For example, if the first air pressure level is set at 100 psi, the reduced second pressure level can be about 80 psi. In various embodiments, the reduction of the pressure level is about 20 psi. In various other embodiments, the reduction of pressure level ranges from about 8 psi to about 10 psi. In various other embodiments, the reduction of pressure level ranges from about 8 psi to about 20 psi. The reduction can depend on various factors such as, but not limited to, characteristics of the air compressor and the first and second hoses, the tool, the nails driven by the tools, the object, and/or the substrate. The drop down air regulator 2160 is configured to supply the pressurized air at the set reduced second level to the second hose 2240. The pressurized air at the reduced second level flows through the second hose 2240 to and through the coupler 2260, to and through the coupler 58 of the tool 50, and into power supply of the tool 50.

In this example embodiment, even though the tool 50 is configured to optimally drive nails at about 90 psi to about 120 psi, the tool 50 will still operate at a sub-optimal pressure (for driving process and/or for the return process) to drive nails at reduced air pressures lower than about 90 psi (such as at about 80 psi). At such reduced air pressures, the tool 50 will drive each nail with relatively less force applied to the head of the nail. The pneumatically powered fastener driving apparatus of the present disclosure thus intentionally uses the pressurized air supply apparatus 2100 to supply pressurized air at a desired sub-optimal reduced pressure level to cause the pneumatically powered fastener driving tool 50 to drive the nail with sufficient amount of force to still drive the nail into the object and the substrate but not to drive the nail too far into the object and the substrate. Thus, again in this embodiment of the present disclosure, counter to conventional thinking regarding making such pneumatic fastener driving tools operate in optimal manners, the present disclosure contemplates making such pneumatic fastener driving tool operate in the described sub-optimal manner(s) to drive the nails at more desired force levels and to appropriately drive certain nails into certain objects and substrates. It should be appreciated that such sub-optimal operation is not required by various embodiments of the present disclosure. Additionally, it should be appreciated that at the reduced pressure level, the pneumatically powered fastener driving tool 50 will engage the head of the nail to drive the nail with sufficient amount of force without damaging a coating on the head of the nail as explained herein.

In this example embodiment, the air compressor 2120 can be any suitable air compressor that is configured to produce and output a continuous supply of pressurized air at a first air pressure level (such as and industry standard level of about 90 psi to about 120 psi). The air compressor 2120 in this illustrated example embodiment is electrically powered, although it can be powered by other suitable energy sources. The air compressor 2120 includes at least one air inlet port (not shown or labeled) and at least one air outlet port. This example air compressor 2120 is shown with three outlet ports 2130*a*, 2130*b*, and 2130*c*. The air compressor 2120 can include one or more outlet couplers (such as outlet coupler 2132) suitably connected to the respective air outlet port 2130*a*. It should be appreciated that while the air compressor 2120 can in certain circumstances be employed to only supply the tool 50 with pressurized air, in many circumstances the air compressor 2120 will be employed for supplying pressurize air to one or more various other tools and apparatus. Due to the potential or actual need to supply such other tools and apparatus, the air compressor 2120 may need to be set to supply air pressure at the first pressure level (such as the industry standard level of about 90 psi to about 120 psi).

The first air supply hose 2140 can be any suitable air supply hose configured to communicate pressurized air in accordance with the present disclosure. In this example embodiment, the first air supply hose 2140 is an elongated rubber hose having an ¼ or ⅜ inch (0.635 or 0.9525 cm) inner diameter and a length of 100 to 300 feet (30.48 to 91.44 meters). It should be appreciated that, in various alternative embodiments, the first air supply hose 2140 can be any suitable size, diameter, and length. The first air supply hose 2140 includes a first hose coupler 2144 at a first end 2142 of the first air supply hose 2140. The first hose coupler 2144 is configured to be removably securely attached to the outlet coupler 2132 of the air compressor 2120. The first air supply hose 2140 also includes a second hose coupler 2148 at an opposite second end 2146 of the first air supply hose 2140. The second hose coupler 2148 is configured to be removably securely attached to the drop down regulator 2160. In various embodiments, either one or both of these couplers 2144 and 2148 can be quick disconnect couplers.

In various embodiments, the first hose 2140 (that is upstream of the drop down air regulator 2160) can have a relatively large volume, and to a certain extent can function as an air storage device.

The drop down air regulator 2160 can be any suitable air pressure regulator that is configured to receive pressurized air at a first level and output pressurized air at a desired reduced second level. The drop down air regulator 2160 includes a housing 2162 and a suitable adjustable setting assembly (not shown) supported by the housing and that enables the operator to set the reduced second pressure level that the drop down air regulator 2160 will output. The drop down air regulator 2160 includes a housing 2162 and a suitable adjustable setting assembly (not shown) supported by the housing and that enables the operator to set the reduced second pressure level that the drop down air regulator 2160 will output.

The housing 2162 of the drop down air regulator 2160 includes an air inlet port (not shown or labeled) and an air outlet port (not shown or labeled). The drop down air regulator 2160 includes an air inlet coupler 2164 connected to the air inlet port on one side of the housing 2162. The drop down air regulator 2160 includes an air outlet coupler 2166 connected to the air outlet port on an opposite side of the housing 2162. The drop down air regulator 2160 is configured to receive from the air compressor 2120 at the first level (such as about 90 psi to about 120 psi) and reduce the pressure level of the pressurized air to a reduced second level (such as about 60 psi to about 100 psi). It should be appreciated that the drop down air regulator 2160 can reduce the pressurized air supply to a reduced second pressure level within such a suitable range, and that the exact amount of the reduction can vary in accordance with the present disclosure. It should be appreciated that the amount of the reduced second pressure level can be based on various characteristics of the air compressor, the tool, the nail, the object, and the substrate, as well as the desired amount of buffer pressure (which is the desired difference between the first pressure level and the second pressure level). It should be appreciated that in various embodiments the drop down air regulator 2160 has an adjustable setting assembly that enables the operator to set the reduced second pressure level from a plurality of different pressure levels. It should be appreciated that in various other embodiments the drop down air regulator 2160 has an adjustable manual setting assembly that enables the operator to manually set the reduced second pressure level from a plurality of different pressure levels.

In other embodiments that are not illustrated, to reduce complexity and weight, the drop down air regulator is more of a bare bones air regulator and does not have a dial or feedback indicator; but rather has a nut that enables a user to adjust the air pressure level or the amount of the reduction in the air pressure level. In certain such embodiments, the drop down air regulator is configured to receive a gauge for calibration. In certain such embodiments, since the drop down air regulator is relatively light in weight, the drop down air regulator can be attached to the tool 50, a coupler 58 of the tool 50, or a relatively short second hose.

The second air supply hose 2240 is configured to communicate pressurized air in accordance with the present disclosure. The second air supply hose 2240 includes a first hose coupler 2242 at a first end 2244 of the second air supply hose 2240. The first hose coupler 2242 is configured to be removably securely attached to an outlet coupler of the drop down air regulator 2160. The second air supply hose 2240 also includes a second hose coupler 2248 at an opposite second end 2246 of the second air supply hose 2240. The second hose coupler 2248 is configured to be removably connected to the pneumatic air connection coupler 58 of the tool 50. In various embodiments, either one or both of these couplers 244 and 148 can be quick disconnect couplers.

In this example embodiment, the second air supply hose 2240 is an elongated rubber hose having a ¼ inch (0.635 cm) inner diameter and a length of 50 to 300 feet (15.24 to 91.44 meters). It should be appreciated that, in various alternative embodiments, the second air supply hose 2240 can be other suitable sizes, diameters, and lengths.

In various other embodiments, the second air hose 2240 is substantially shorter than the first hose 2140, and can for example be approximately 10 feet (3.048 meters). In various other embodiments, the second air hose 2240 is substantially shorter than the first hose 2140, and can for example be approximately 10 to 20 feet (3.048 to 6.098 meters). In various other embodiments, the second air hose 2240 is substantially shorter than the first hose 2140, and can for example be less than 10 feet (3.048 meters). It should thus be appreciated that in various embodiments, the second hose is particularly minimized to be as close to the fastener driving tool and site as possible.

Having described the various structural components of this example embodiment of the fastener driving apparatus, a brief description of one example method of operating these alternative example embodiments of the fastener driving apparatus is now provided. The compressor 2120 intakes air and creates pressurized air at a first pressure level of about 90 psi to about 120 psi. The compressor 2120 communicates this pressurized air at the first pressure level to the first air supply hose 2140. The compressor 2120 can also communicate pressurized air at this first pressure level to one or more other pneumatic devices (not shown) via one or more additional air supply hoses (not shown). The first air supply hose 2140 communicates this pressurized air at the first pressure level of about 120 psi to the drop down air regulator 2160. The drop down air regulator 2160 reduces the pressure level of the received pressurized air from the first pressure level (such as from about 90 psi to about 120 psi) to a reduced second pressure level (such as from about 60 psi to about 100 psi). It should be appreciated that this reduced second pressure level can vary in such the range in accordance with the present disclosure. The drop down air regulator 2160 communicates the pressurized air at the reduced second pressure level to the second air supply hose 2240. The pressurized air at the reduced second pressure level flows through the second air supply hose 2240 though the coupler 58 of the tool 50 and into power supply of the tool 50.

For each actuation of the pneumatic fastener driving tool 50 supplied with this reduced second pressure level, the pneumatic fastener driving tool 50 generates a suitable reduced driving force for driving each fastener due to this received pressurized air at the reduced second pressure level. For example, based on the received pressurized air at the reduced second pressure level of about 80 psi, the pneumatic fastener driving tool 50 can generate enough driving force for driving each nail. This reduced driving force can be lower than the optimal driving force that the pneumatic fastener driving tool 50 would normally generate when it receives pressurized air at the first pressure level such as of about 120 psi. This reduced driving force that the pneumatic fastener driving tool 50 applies to the nail enables the nail to be drive into the object and the substrate as shown in FIG. 1D. This driving of the nail at the reduced driving force reduces the likelihood of occurrence of the sets of issues described above in relation to FIGS. 1A and 1B (i.e., the force does applied does not drive the nail too far into the object and the substrate). This driving of the nail at the reduced driving force also is also sufficient enough to reduce the likelihood of occurrence of the set of issues described above in relation to FIG. 1C (i.e., the force is sufficient enough to drive the nail into the object and the substrate). It should also be appreciated that the reduced second air pressure level will be much more constant because it is below the pressure ranges provided by the air compressor and thus accounts for leaky air compressor and other fluctuations of air pressure in the entire apparatus.

In various embodiments, the fastener driving apparatus has a downstream volume of approximately 0.225 $ft^3$ which is at most 15 times the volume of the tool consumption which is approximately 0.015 $ft^3$.

In various embodiments, the fastener driving apparatus has a downstream volume of at most 5 times the volume of the tool consumption. In certain such embodiments, this corresponds to a 200 ft ¼" id second hose or less.

While particular embodiments of a powered fastener driving apparatus have been described herein, it will be appreciated by those skilled in the art that changes and modifications may be made thereto without departing from the invention in its broader aspects and as set forth in the following claims.

The claims are as follows:

1. A fastener driving apparatus comprising:

an air compressor configured to generate pressurized air at a first pressure level;

an air storage tank;

a drop down air regulator located external to the air storage tank and configured to reduce the pressurized air from being at the first pressure level to being at a reduced second pressure level;

a first air supply hose configured to fluidly communicate pressurized air between the air compressor and the drop down air regulator; and a pneumatically powered fastener driving tool including a fastener driver, the pneumatically powered fastener driving tool configured to either: (a) employ the pressurized air at the first pressure level to generate a first driving force on the fastener driver to drive a fastener; or (b) employ the pressurized air at the second reduced pressure level to generate a reduced second driving force on the fastener driver to drive the fastener; and a second air supply hose configured to fluidly communicate pressurized air between the drop down regulator and the pneumatically powered fastener driving tool;

wherein the air storage tank is in fluid communication with the first air supply hose and the second air supply hose, wherein the first air supply hose is removably mechanically and fluidly connected to the air compressor and the drop down regulator, wherein the drop down regulator is removably mechanically and fluidly connected to the first check valve, wherein the first check valve is directly removably mechanically and fluidly connected to the air storage tank, wherein the air storage tank is directly removably mechanically and fluidly connected to a coupler, wherein the coupler is directly removably mechanically and fluidly connected to the second air supply hose, and wherein the second air supply hose is directly removably mechanically and fluidly connected to a pneumatic air connection coupler of the pneumatically powered fastener driving tool.

2. The fastener driving apparatus of claim 1, wherein the first check valve includes an air inlet coupler connected to an air outlet coupler of the drop down regulator and an air outlet coupler connected to the air inlet coupler of the air storage tank.

3. The fastener driving apparatus of claim 1, wherein the first pressure level is in a first range from about 90 psi to about 120 psi and the reduced second pressure level is in a second range of about 60 psi to about 100 psi.

4. The fastener driving apparatus of claim 1, wherein the first pressure level is about 8 psi to about 10 psi greater than the second pressure level.

5. The fastener driving apparatus of claim 1, wherein the drop down air regulator includes an adjustable pressure setting assembly.

6. A method of operating a fastener driving apparatus, said method comprising:

causing an air compressor to generate pressurized air at a first pressure level;

reducing, via a drop down air regulator external to an air storage tank, the pressurized air from being at the first pressure level to being at a reduced second pressure level;

causing pressurized air at a first pressure or a second pressure to flow through a first check valve removably and mechanically directly attached to the air storage tank; and causing a pneumatically powered fastener driving tool including a fastener driver to employ the pressurized air at the second reduced pressure level to generate a reduced second driving force on the fastener driver to drive a fastener by engaging a head of the fastener.

7. The method of claim 6, which includes the drop down air regulator reducing the pressurized air from being at the first pressure level to being at the reduced second pressure level after the pressurized air exits an air storage tank.

8. The method of claim 6, which includes the drop down air regulator reducing the pressurized air from being at the first pressure level to being at the reduced second pressure level before the pressurized air enters an air storage tank.

9. The method of claim 6, wherein the first pressure level is in a first range from about 90 psi to about 120 psi and the reduced second pressure level is in a second range of about 60 psi to about 100 psi.

10. The method of claim 6, wherein the first pressure level is about 8 psi to about 10 psi greater than the second pressure level.

11. The method of claim 6, wherein the pneumatically powered fastener driving tool includes a fastener driver, the pneumatically powered fastener driving tool configured to either: (a) employ the pressurized air at the first pressure level to generate a first driving force on the fastener driver to drive a fastener; or (b) employ the pressurized air at the second reduced pressure level to generate a reduced second driving force on the fastener driver to drive the fastener.

12. The method of claim 6, which includes causing the pneumatically powered fastener driving tool to generate a reduced driving force for driving the fastener due to the received pressurized air at the reduced pressure level of about 60 psi to about 100 psi.

13. The method of claim 6, wherein the fastener includes a nail and the head has a coating, and which includes causing the pneumatically powered fastener driving tool to drive the nail into an object without damaging the coating on the head of the nail.

14. The method of claim 13, wherein the coating on the head of the nail is substantially the same color as an outer surface of the object.

15. The method of claim 6, which includes setting an adjustable pressure setting assembly of the drop down air pressure regulator to the reduced second pressure level.

16. A fastener driving apparatus comprising:

an air compressor configured to generate pressurized air at a first pressure level;

an air storage tank;

a drop down air regulator located external to the air storage tank and configured to reduce the pressurized air from being at the first pressure level to being at a reduced second pressure level;

a first air supply hose configured to fluidly communicate pressurized air between the air compressor and the air storage tank;

a pneumatically powered fastener driving tool including a fastener driver, the pneumatically powered fastener driving tool configured to either: (a) employ the pressurized air at the first pressure level to generate a first driving force on the fastener driver to drive a fastener; or (b) employ the pressurized air at the second reduced pressure level to generate a reduced second driving force on the fastener driver to drive the fastener; and a second air supply hose configured to fluidly communicate pressurized air between the air storage tank, drop down regulator and the pneumatically powered fastener driving tool;

wherein the air storage tank is in fluid communication with the first air supply hose and the second air supply hose, wherein the first air supply hose is removably mechanically and fluidly connected to the air compressor and to a first check valve, wherein the first check valve is directly removably mechanically and fluidly connected to the air storage tank, wherein the air storage tank is removably mechanically and fluidly connected to the drop down air regulator, wherein the drop down regulator is removably mechanically and fluidly connected to the second air supply hose that is removably mechanically and fluidly connected to a pneumatic air connection coupler of the pneumatically powered fastener driving tool.

17. The fastener driving apparatus of claim 16, wherein the first check valve includes an air inlet coupler connected to an air outlet coupler of the drop down regulator and an air outlet coupler connected to the second supply hose.

18. The fastener driving apparatus of claim 16, wherein the first pressure level is in a first range from about 90 psi to about 120 psi and the reduced second pressure level is in a second range of about 60 psi to about 100 psi.

19. The fastener driving apparatus of claim 16, wherein the first pressure level is about 8 psi to about 10 psi greater than the second pressure level.

20. The fastener driving apparatus of claim 16, wherein the drop down air regulator includes an adjustable pressure setting assembly.

* * * * *